Figure 2:
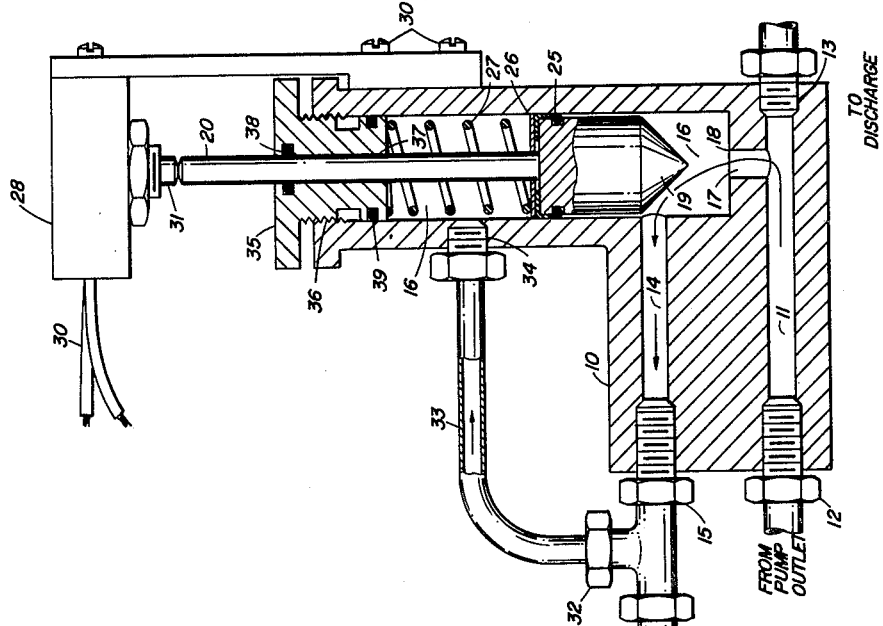

July 20, 1965

I. R. NORSTRUD ETAL 3,195,556

PRESSURE RELIEF VALVE FOR CONTROLLING PUMP

Filed Dec. 26, 1962

INVENTOR.
IVEN R. NORSTRUD
JOHN H. THRELKELD
BY
*Schroeder & Siegfried*
ATTORNEYS

United States Patent Office 3,195,556
Patented July 20, 1965

3,195,556
PRESSURE RELIEF VALVE FOR
CONTROLLING PUMP
Iven R. Norstrud and John H. Threlkeld, Britt, Iowa, assignors to Britt Tech Corporation, Britt, Iowa, a corporation of Iowa
Filed Dec. 26, 1962, Ser. No. 247,126
3 Claims. (Cl. 137—115)

This invention relates to the field of fluid control valves and more particularly to relief valves used in a liquid system.

The present invention contemplates using a relief valve controlled by a pair of orifices or fluid passage restrictions whereby the different pressures are regulated within the relief valve. It is further contemplated that where difficulty has been experienced in some applications using a water source where the pressure is not constant and where pressure surges are experienced or where the water pressure is extremely high, the present invention will overcome these difficulties. Where these conditions exist, the relief valve is provided with means for neutralizing these pressures which affect the valve operation and thereby makes the relief valve independent of the water line-pressure. For some applications, because of the ease of operation of the relief valve, an additional control element may be used therewith, its operation being actuated by the operation of the relief valve.

It is therefore a general object of the present invention to provide novel and improved relief valve means of simple and inexpensive construction.

It is another object of this invention to provide a relief valve which is independent of water line-pressure or changes in pressure.

It is still another object of the present invention to provide a relief valve which is adaptable to have its rate of opening changed.

It is a more specific object of this invention to provide relief valve means wherein the pressures within the valve are determined by a pair of orifices in the fluid pressure passages.

It is still another object of the present invention to provide a relief valve having a single communication forming the liquid by-pass.

It is still a further object of this invention to provide a relief valve wherein the closing force is equal to or greater than the force created by the pressure acting on the piston as determined by the by-pass orifice.

Figure 1:
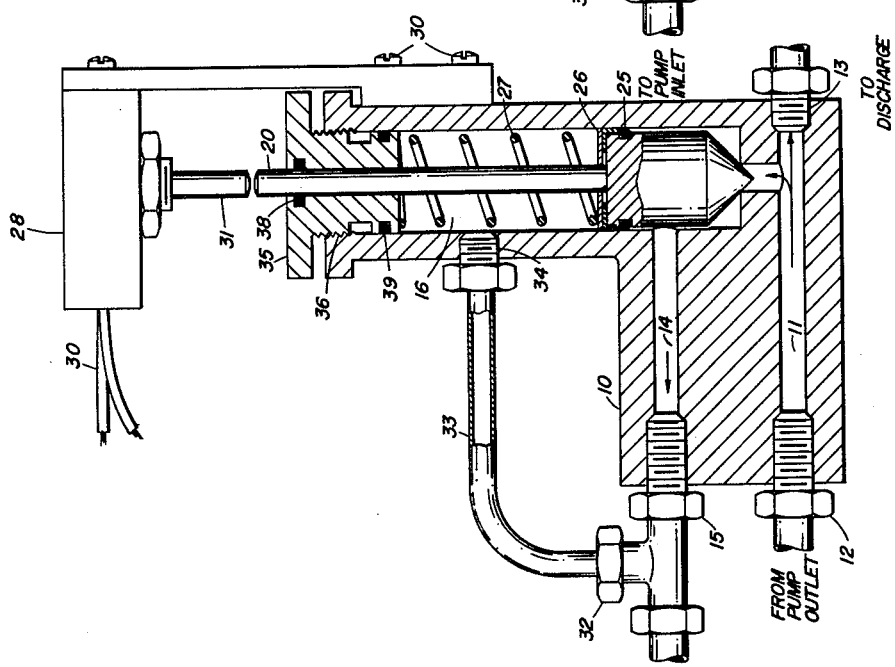

These and other objects and advantages of this invention will more fully appear from the following description, made in connection with the accompanying drawings, wherein like reference characters refer to the same or similar parts throughout the several views, and in which:

FIG. 1 is a vertical section of the relief valve using water line neutralization shown in deenergized position; and FIG. 2 is a vertical section of the relief valve using water line neutralization shown in actuated position.

The relief valve housing 10 has a fluid pressure transmitting passage 11 which is connected to a coupling 12 that is in fluid receiving communication from a pump (not shown). The other end of the fluid pressure transmitting passage 11 is connected to an orifice 13 which is generally connected to some form of liquid discharge device such as a spray gun or liquid control nozzle having a valve for controlling the amount of liquid to be dispensed. A fluid pressure by-pass 14 is also formed in housing 10 and is in fluid communication with an orifice 15 which is generally connected through a fluid line to a pump inlet. In other words, orifice 15 would be connected to the pump inlet and coupling 12 would be connected to the outlet from the pump. In fluid communication with by-pass 14, is a cylindrically shaped chamber 16 and it will be seen that any fluid flowing between chamber 16 and the pump must pass through orifice 15 located in the fluid pressure by-pass 14. A passage 17 is in communication with pressure transmitting passage 11 and defines an aperture 18 which also forms a valve seat for use with a piston 19. Piston 19 has a conical shape on its downwardly extending end which fits into valve seat 18 so that the two form a valve and when in the position as shown in FIG. 1, the valve shuts off the flow of any fluid into chamber 16. Piston 19 has a vertically extending control element 20 connected therewith or fastened thereto which extends through a bore 21 of a plug 22 that is secured to housing 10 by suitable means such as screw threads 23. In other words, control element 20 is allowed to move vertically upwardly and downwardly within plug 22. Chamber 16 also extends above piston 19 and is in communication with a vent which allows the air to escape from the upper part of chamber 16 when piston 19 is extended upwardly. Piston 19 is held in fluid sealing relationship with the walls of cylindrically shaped chamber 16 by an O ring 25 which is fitted in a circumferential groove about piston 19. Situated directly above piston 19 is a washer 26 which is extended over control rod 20 and a biasing spring 27 which is a compression spring, located between washer 26 and plug 22 to maintain piston 19 in sealing engagement with valve seat 18 as long as the pressure in the pressure transmitting passage is insufficient to cause piston 19 to be driven upwardly. It will also be noted that by the movement of plug 22, that the force created by spring 27 may be adjusted for different pressures.

Where control element 20 is in the form of a rod, it may sometimes be convenient to place an additional control element such as a switch 28 in a position where rod element 20 may cause its actuation. To accomplish such an actuation, a bracket 29 is secured to valve housing 10 by a pair of screws or other suitable fastening means 30 and switch element 28 is likewise secured in suitable manner to bracket 29 by screws 30 or other suitable fastening means. Switch 28 has a plunger 31 which is situated directly above control rod 20 and upon control rod 20 moving vertically, plunger 31 is depressed as shown in FIG. 2. Switch 28 may be of any suitable type which changes its electrical state each time its operating element is actuated. That is, in the present situation, where plunger 31 is depressed and released the contacts within the switch are either engaged or disengaged but remain so upon plunger 31 assuming its normal position. For the particular embodiment shown, only two states of electrical condition are shown, but it is contemplated that switch 28 may have several contacts, each distinct from the other and capable of being sequentially actuated when plunger 31 is depressed and after being actuated a given number of times, its original condition is again resumed. In other words, it could take on the form of a stepping switch or the like. As an example of an application of our improved control valve, reference is made to our co-pending application, now Patent 3,140,049 dated July 7, 1964, entitled, "Cleaning Apparatus With Relay Control Valve."

To more properly define the operating conditions of the relief valve, it has been found that where piston 19 is approximately 0.375 (3/8) of an inch in diameter, that orifice 13 is generally 0.0468 (3/64) of an inch in diameter and orifice 15 is approximately 0.0782 (5/64) of an inch in diameter. Further explanation of the operation of the relief valve will establish the operating pressures and characteristics thereof.

Upon the pressure building up in passage 11 and 17, once the pressure exerted on the end of the conically shaped piston 19 engagaing valve seat 18 reaches a predetermined value, piston 19 will be forced upwardly. The pressure for initially operating piston 19 is determined by the size of aperture 18 and for a typical operation, approximately 600 p.s.i. is required to overcome the force exerted by biasing spring 27. However, once piston 19 is moved vertically upward, the entire end of piston 19 is exposed to the pressure of the incoming fluid and therefore the piston is snapped towards the upper end of its travel because of the greater force being exerted due to the increased area of the piston face now being encountered by the fluid under pressure. The piston remains vertically displaced from aperture 18 forming the valve seat and the fluid is then allowed to flow through orifice 15, which establishes the pressure in the by-pass 14 and the line to the pump as approximately 200 p.s.i. Initially, the pressure in passage 11 must reach approximately 600 p.s.i. to move the piston vertically due to the small size of aperture 18 and the small end area of piston 19 exposed to the fluid under pressure. Once the by-pass is in operation, the fluid returning from the pump has a secondary route which may be taken through opening 17 into chamber 16 and hence through by-pass 14 to recirculate through the pump. However, if the pressure in the pressure transmitting passage 11 drops below 200 p.s.i., which would be the condition where the fluid is being dispensed and passes through orifice 13, the force exerted by spring 27 would overcome the force acting against it through piston 19 and piston 19 would again be driven into engagement with valve seat 18. Under these conditions, where orifice 13 is of the dimensions given, the pressure will be allowed to build back to approxmately 500 p.s.i. with the discharge device open and upon further obstruction to the flow of fluid, the cycle will be repeated as just stated. It will, of course, be understood that the size of the orifices may be varied and the force exerted by biasing spring 27 may be changed by the adjustment of plug 22, but in each instance orifice 15 can never be any smaller than orifice 13 and is generally somewhat larger so that upon the pressure being reduced in the pressure transmitting passage 11, piston 19 may again seat itself in valve seat 18. However, it has generally been found that where the operating pressure is approximately 2½ times the pressure in the passages when piston 19 is energized, that is, in the condition as shown in FIG. 2, the tripping or energizing pressure is approximately three times the pressure in the valve when actuated as just described.

Should the situation arise where high fluid pressure fluctuations in the water source connected to the pump occur, these pressure fluctuations will be added to the output pressure of the pump. Under these conditions it will be seen that the fluid in the passage 11 may be varying and unusually high such as to cause actuation of the piston 19 thereby opening the by-pass 14 to allow fluid to be transmitted back to the pump. In certain usages, this actuation upon momentary pressure surges may not be desirable, inasmuch as the valve under certain conditions should be actuated only by sustained high pressure conditions. This problem has been eliminated by connecting a coupling 32 at the pump inlet and downstream from orifice 15 in the by-pass 14 and extending a fluid transmitting line 33 into an orifice 34 which is screwed into an opening that formerly constituted a vent. It has been found that for the particular application using the dimensions given previously for the orifices, that line 33 may be of approximately 0.125 (⅛) of an inch in diameter. As will be explained in more detail, orifice 34 may be made slightly smaller for certain operations. Since the fluid that appears in coupling 32 is allowed to fill chamber 16 above piston 19, a fluid sealing relationship must be formed at the upper end of housing 10 to insure that the relief valve does not leak around the control rod 20. This is accomplished by using a plug 35 that is secured to housing 10 by screw threads 36 so that the plug may be varied upwardly and downwardly within chamber 16. A central bore 37 is formed in the center of plug 35 and an O ring 38 is placed within an annular recess communicating with bore 37 so that rod 20 is in fluid sealing relationship with plug 35 through O ring 38. As plug 35 is varied upwardly or downwardly by the use of screw threads 36, a lower portion of plug 35 has an external annular recess into which is fitted an O ring 39 that forms a fluid seal between plug 35 and the wall of the relief valve housing 10 forming that part of chamber 16. Thus there is a fluid seal between housing 10 and plug 35 and between rod 20 and plug 35 at the upper end of chamber 16 and O ring 25 forms a fluid seal between piston 19 and the lower portion of chamber 16. Thus the fluid lying above piston 19 and below plug 35 is at the same pressure as the liquid directed to the pump inlet which when the piston 19 engages valve seat 18 is generally the inlet line pressure. The same line pressure is then carried through the pump to appear in passage 11 and therefore it can be seen that the inlet line pressure appears both above and below piston 19 thereby rendering it insentitive to the changes which may occur in the pressure of the source of liquid. Once the pressure builds up in passage 11 and acts upon piston 19, control rod 20 will be forced upwardly in the manner described previously to actuate plunger 31 of switch 28. In other words, it is only the additional pressure occurring in passage 11 due to an obstruction or closing of a discharge device which is connected to orifice 13, that is applied against piston 19.

In some instances, it may be desirable to control the rate at which piston 19 moves upwardly and this may be accomplished by varying the size of orifice 34 so that the line 33 contains a restriction to the flow of fluid from chamber 16 and thus the movement of piston 19 is at a lower rate than when merely acting against atmospheric pressure. Such an operation will help improve the valve life and keep the wearing of the moving parts to a minimum. Of course, the pressure at which valve 19 may be forced upwardly may be controlled by the adjustment of plug 35 in the same manner as the adjustment of plug 22 described previously.

It will be seen that a relief valve has been disclosed which is of relatively simple operation and yet is extremely reliable. It has been demonstrated that by the use of an orifice at the output of the relief valve, which is larger than the orifice used in the fluid pressure transmitting passage, a proper operating condition is maintained whereby the relief valve may use a single opening between the main fluid passage and the by-pass return line to the pump. It has been shown that the relief valve is especially suited for conditions of varying fluid pressures or high pressure since the valve is operable independent of the liquid source pressure. The relief valve may have an operating element which when combined with another control element provides a unique control for operating other fluid control elements as a direct result of a change in the pressure within the relief valve. This is especially true when the element which is actuated by the relief valve control member is of the sequential type control thereby allowing a sequence of control functions actuated by the pressure changes within the relief valve.

It will, of course, be understood that various changes may be made in the form, details, arrangement and proportions of the parts without departing from the scope of this invention which consists of the matter shown and described herein and set forth in the appended claims.

What is claimed is:
1. A relief valve comprising:
 (a) a fluid pressure transmitting passage adapted to be connected to the outlet of a pump at one end and a discharge device at the other end;

(b) a fluid pressure by-pass having a fluid passage adapted to be connected to the inlet of a pump at one end and having a cylindrically shaped chamber at the other end, the two communicating with each other through an orifice of larger area than the smallest cross-sectional area of said fluid pressure transmitting passage to a discharge device for determining the magnitude of a relatively low pressure;

(c) a communication having a small aperture positioned between said fluid pressure transmitting passage and said cylindrically shaped chamber upstream from said smallest cross-sectional area, said communication forming the only fluid connection between said pressure transmitting passage and said by-pass;

(d) a piston in fluid sealing relation with said cylindrically shaped chamber having a conically shaped end covering said aperture and having a control engaging element formed as a part thereof;

(e) a conduit in fluid communication with said cylindrically shaped chamber above said piston and with said fluid pressure by-pass between said orifice and an end of said by-pass adapted to be connected to the inlet of a pump so that the pressure of a source of fluid is applied above said piston and to the fluid pressure transmitting passage communicating with the lower side of said piston;

(f) and a spring biasing said piston to normally close said small aperture, said piston requiring a relatively high pressure through said aperture for actuation and displacement thereof but requiring only a relatively low pressure against said entire end area to maintain said displacement after being actuated, said piston remaining displaced until the pressure in said orifice becomes lower than said low pressure allowing said spring to again bias said piston to close said aperture.

2. The invention as set forth in claim 1 wherein the control engaging element extends through the cylindrically shaped chamber and said chamber includes a sealing means disposed between the control engaging element and said chamber to contain fluid above said piston, and including an electrical control element fixedly mounted in operable relationship to the control engaging element of said piston, said control element having at least two different electrical states sequentially controlled by said piston being displaced from a closed position to an open position with respect to said small aperture.

3. The invention in accordance with claim 1 in which the piston is in sealing relationshp with the cylndrcally shaped chamber and has a cross-sectonal area substantially greater than that of said small aperture which is exposed to the fluid below the piston.

References Cited by the Examiner

UNITED STATES PATENTS

| | | | |
|---|---|---|---|
| 2,159,419 | 5/39 | Bearss et al. | 200—82 |
| 2,162,898 | 6/39 | Rotter | 137—469 XR |
| 2,665,704 | 1/54 | Kanuch | 137—115 XR |
| 2,828,760 | 4/58 | Taylor et al. | 137—115 |
| 2,881,793 | 4/59 | Lee | 251—282 XR |
| 3,044,484 | 7/62 | Dunning | 137—469 |

ISADOR WEIL, *Primary Examiner.*